United States Patent [19]

Granata

[11] Patent Number: 4,645,636

[45] Date of Patent: Feb. 24, 1987

[54] MEASURING HEAD FOR DETERMINING THE PRESSURE OF FISSION GASES RELEASED INSIDE BARS OF NUCLEAR FUEL

[75] Inventor: Saverio Granata, Pisa, Italy

[73] Assignee: AGIP, S.p.A., Rome, Italy

[21] Appl. No.: 599,257

[22] Filed: Apr. 11, 1984

[30] Foreign Application Priority Data

Apr. 22, 1983 [IT] Italy ................................ 20741 A/83

[51] Int. Cl.[4] ............................................. G21C 17/00
[52] U.S. Cl. .................................... 376/247; 376/251; 376/450; 376/451
[58] Field of Search ................ 376/450, 451, 247, 251

[56] References Cited

U.S. PATENT DOCUMENTS 3,846,235  11/1974  Jones .................................... 376/450

Primary Examiner—Donald P. Walsh
Attorney, Agent, or Firm—Hedman, Gibson, Costigan & Hoare

[57] ABSTRACT

A measuring head suitable for determining the pressure of fission gases released inside non-instrumented bars of nuclear fuel (which have reached high irradiation levels), and for connection to said bars by a method which allows no escape of said active gases and does not cause appreciable disturbance either to the fuel or to the released fission gases.

1 Claim, 1 Drawing Figure

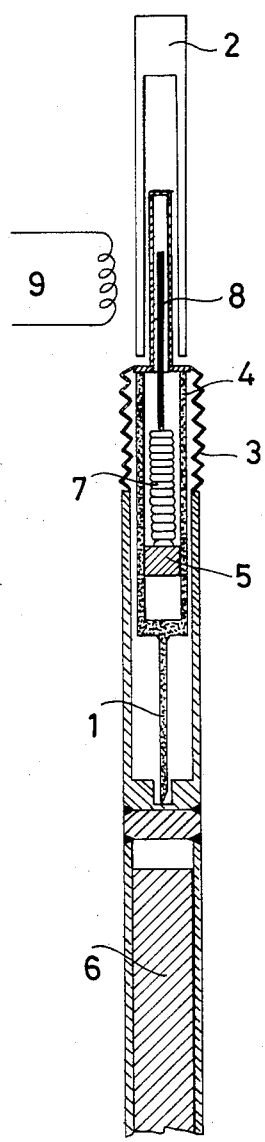

MEASURING HEAD FOR DETERMINING THE PRESSURE OF FISSION GASES RELEASED INSIDE BARS OF NUCLEAR FUEL

This invention relates to a measuring head suitable for determining the pressure of fission gases released inside non-instrumented bars of nuclear fuel which have reached high irradiation levels, and to the method for connecting said head to said bars, It is well known in the art that it is possible to instrument bars of nuclear fuel in order to determine their behaviour to irradiation in test reactors, i.e. the variation in their critical parameters as a function of time.

According to the known art, this instrumentation is inserted into the new bars during their manufacture, i.e. before they are placed inside a test reactor and then irradiated.

On the other hand, it is of great interest to known the state of the fuel inside bars which have not been previously instrumented (and which have attained high irradiation levels), where these bars originate either from test reactors (in order to conduct further less costly and more binding tests) or from power reactors (in order to know their real conditions at that instant of time, especially after abnormal operation or accidents).

There is therefore the problem of fitting these particular bars of fuel (i.e. those not previously instrumented) with adequate instrumentation after they have been irradiated either in a test reactor or in a power reactor, and this represents the basic object of the present invention.

One known method for fitting instrumentation to bars which have already operated for a certain time in a reactor is to totally or partially dismantle such bars of fuel in a hot cell after they have been removed from the reactors where they have been irradiated, and then to completely reassemble them, again in a hot cell, but providing them additionally with suitable instrumentation (mainly pressure measuring device for the fission gases). This known method obviously has the drawback of requiring the entire bar to be reassembled at a greater cost than the cost of manufacturing a new bar, and in addition the conditions of the fuel and of the fission gases inside the reassembled bar are completely different at the end of the operation than the original conditions, and thus no longer represent the state of the old fuel.

In contrast, the measuring head according to the present invention does not require the bar of nuclear fuel to be opened during instrumentation fitting (thus preventing the escape of radio-active gases from the inside of the bar to the external environment, this being of considerable importance for operational safety) and thus does not appreciably disturb the state of the gases and fuel inside said bar.

The measuring head according to the present invention is constituted by two main parts, namely a lower part containing the perforation means and an upper part containing a pressure measuring device, these parts forming overall a long metal casing which is hermetically sealed at its two ends.

Said casing, while still hermetically sealed, is welded to one end of the bar of fuel and, when welding has been completed and checked, it is possible to perforate the measuring head and bar by means of the equipment contained in the lower part of said head, thus allowing the fission gases to pass from the bar to the measuring head, where a suitable instrument prearranged in its upper part allows the pressure to be measured.

In particular, said measuring head is provided in its interior (in its lower part) with a percussion perforation system constituted by a cutting point which can be struck by way of a sealed metal bellows (for example by hitting the end with a hammer) to thus form the hole by piercing the wall. There is in fact simultaneous perforation of the base of the measuring head and the plug of the bar.

The measuring head according to the invention is described hereinafter with reference to the accompanying drawing, which shows a nonlimiting embodiment of the invention.

In the accompanying figure, the reference numeral 1 indicates the cutting point, 2 the mobile percussion pin, 3 the metal bellows, 4 the support bracket for the point, 5 the support bracket for the pressure measuring device 7, 6 the bar of fuel, and 8 the iron core (ferrox cube) which constitutes the mobile part of a differential transformer 9.

The measuring head according to the present invention is constituted by a cyindrical casing welded lowerly to the plug of the bar of nuclear fuel and provided upperly with a metal bellows welded lowerly to said cylindrical casing and provided upperly with a metal closure disc which comprises a hole in its centre or in proximity to its centre. Said hole connects the interior of the cylindrical casing and of the bellows to the interior of a metal tube which has a diameter less than that of the cylindrical casing, is welded at one end to said metal disc, and is closed at its other end.

A metal bracket preferably of U shape which terminates lowerly in a pointed metal bar is welded to the inner face of the metal closure disc.

The cylindrical casing internally contains a metal bellows sensitive to pressure variations, which is lowerly fixed to the cylindrical casing by suitable means and is provided upperly with an iron core which penetrates into the aforesaid metal tube of smaller diameter. The movements which said iron core makes as a function of the compression of the metal bellows due to the pressure variations are recorded by means of a differential transformer, the mobile part of said differential transformer being constituted by said core.

I claim:

1. A device for measuring the pressure of released fission gases within a nuclear fuel bar having a high degree of irradiation, comprising:
    an outer cylindrical section having a sealed lower end adapted to be positioned on the fuel bar, and an open upper end;
    a metal bellows adapted at its lower end to the open upper end of said outer section and having a metal closure disc adapted to the upper end of said bellows said disc having a perforation at or near its center;
    an upper cylindrical section having a breadth less than said outer cylindrical section, a sealed upper end and a open lower end adapted to be positioned on the top side of said metal closure disc so as to seal said perforation;
    a first inner cylindrical section adapted to be positioned within said outer cylindrical section, including:
        a U-shaped bracket adapted at its open upper end to the bottom side of said metal closure disc, and an elongated perforation means attached at its upper end to the closed lower end of said U-shaped bracket and extending downwardly to a point to the sealed lower end of said outer cylindrical section;

a second inner cylindrical section, adapted to be positioned within said first inner cylindrical section, including:

a second metal bellows sensitive to pressure variations attached at its lower end to the inside wall of said U-shaped bracket, and an iron core attached at its lower end to the upper end of said second metal bellows, the top end of said core being freely moveable and extending through said penetration in said metal closure disc and into said upper cylindrical section; and a differential transformer positioned externally to said upper cylindrical section for measuring meovements of said iron core said movements resulting from puncturing the fuel bar with said elongated perforation means thereby allowing released fission gas from the fuel bar to enter said outer cylindrical section to compress said second metal bellows thereby moving said iron core.

* * * * *